(12) United States Patent
Laureano-Osorio (10) Patent No.: US 10,755,265 B1
(45) Date of Patent: Aug. 25, 2020

(54) OFFICIALLY AUTHORIZED VIRTUAL IDENTIFICATION CARDS

(71) Applicant: Evelyn Laureano-Osorio, Alturas Parque Escorial Carolina, PR (US)

(72) Inventor: Evelyn Laureano-Osorio, Alturas Parque Escorial Carolina, PR (US)

(*) Notice: Subject to any disclaimer, the term of this patent is extended or adjusted under 35 U.S.C. 154(b) by 0 days.

(21) Appl. No.: 16/353,684

(22) Filed: Mar. 14, 2019

Related U.S. Application Data (63) Continuation-in-part of application No. 14/999,258, filed on Apr. 6, 2015, now abandoned.

(51) Int. Cl.
*G06K 5/00* (2006.01)
*G06Q 20/36* (2012.01)
*G06Q 50/26* (2012.01)

(52) U.S. Cl.
CPC ......... *G06Q 20/363* (2013.01); *G06Q 50/265* (2013.01)

(58) Field of Classification Search
CPC ...... G06K 19/00; G06Q 20/20; G06Q 20/206; G06Q 20/34

USPC .................. 235/380, 382, 385, 492
See application file for complete search history.

(56) References Cited

U.S. PATENT DOCUMENTS

| | | | | |
|---|---|---|---|---|
| 9,325,807 | B1* | 4/2016 | Meoli | H04L 67/42 |
| 2009/0013359 | A1* | 1/2009 | Butler | G06Q 30/06 |
| | | | | 725/105 |
| 2012/0036017 | A1* | 2/2012 | Hasson | G06Q 20/3274 |
| | | | | 705/14.64 |
| 2013/0139222 | A1* | 5/2013 | Kirillin | H04L 67/02 |
| | | | | 726/4 |
| 2017/0053268 | A1* | 2/2017 | Pande | G06Q 30/0259 |

\* cited by examiner

*Primary Examiner* — Daniel St Cyr
(74) *Attorney, Agent, or Firm* — John Rizvi; John Rizvi, P.A.—The Patent Professor (57) ABSTRACT

A system that allows users to display valid identification via a mobile device. Authentic and valid IDs and secure folders are verified by a certificate authority. Statistical techniques are applied to automatically determine the consistency and reliability of user data. Context is automatically determined to display data according to the context.

18 Claims, 5 Drawing Sheets

OFFICIALLY AUTHORIZED VIRTUAL IDENTIFICATION CARDS

CROSS-REFERENCE TO RELATED APPLICATION

This U.S. Non-Provisional patent application is a continuation-in-part of co-pending U.S. Non-Provisional patent application Ser. No. 14/999,258, filed Apr. 6, 2015, which is incorporated herein in its entirety.

FIELD OF THE INVENTION

The present invention relates generally to mobile computing, and more particularly, to a mobile wallet.

BACKGROUND OF THE INVENTION

As mobile computing devices have become more central to users' everyday lives, it is not uncommon for a user to carry his/her mobile computing device nearly everywhere him or her. For example, users often carry their mobile computing devices with them at home, at work, church, and at social events.

Also, it is common for users to carry many identification cards because it is very common for certain environments (e.g. commercial or governmental) to require valid identification.

Various systems exist that allow users to store credit cards or other identification cards on their cellular phone. However, these systems do not synchronize with databases of qualified certificate authorities for authorizing an identification card using a user's device. For example, using current systems, a virtually stored driver's license cannot be presented as a valid ID if the original and physical ID card is not present.

Therefore, there exists a need for a mobile identification card system that allows users to carry valid identification through their personal electronic devices.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present invention is directed to a transaction management system comprising:

a server;

a mobile wireless communications device communicating with said server;

said system configured to:

generate a plurality of secure folders for respective users, each secure folder comprising a folder identification, a folder type, a folder name, and a parent folder identification, store a given mobile digital wallet therein for a given user, the given mobile digital wallet comprising only a plurality of digital identification (ID) cards, the given mobile digital wallet being stored in a given secure folder from the plurality thereof, provide a graphical user interface (GUI) for selection of a respective digital ID card, share at least one digital ID card from the given mobile digital wallet with a different user;

a synchronization interface in communication with said server and said mobile wireless communications device and configured to synchronize the given mobile digital wallet with said server; and a filter operating between said server and said mobile wireless communications device and configured to capture data associated with a transaction;

each digital ID card comprising textual description, image data, a user name, and a password; and wherein a folder of the mobile wireless communications device is synchronized with a folder of a qualified certificate authority such that an ID stored in the folder of the mobile wireless communications device is a valid replica of an issued ID stored in the folder of the qualified certificate authority, allowing the ID stored in the mobile wireless communications device to be a virtual valid ID that is in a protected folder on the mobile wireless communications device, wherein the digital ID is issued by the qualified certificate authority.

In another aspect, said mobile wireless communications device is configured to select the respective digital ID card based upon a context of use.

In another aspect, said mobile wireless communications device is configured to receive via the GUI a user password and a user ID.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
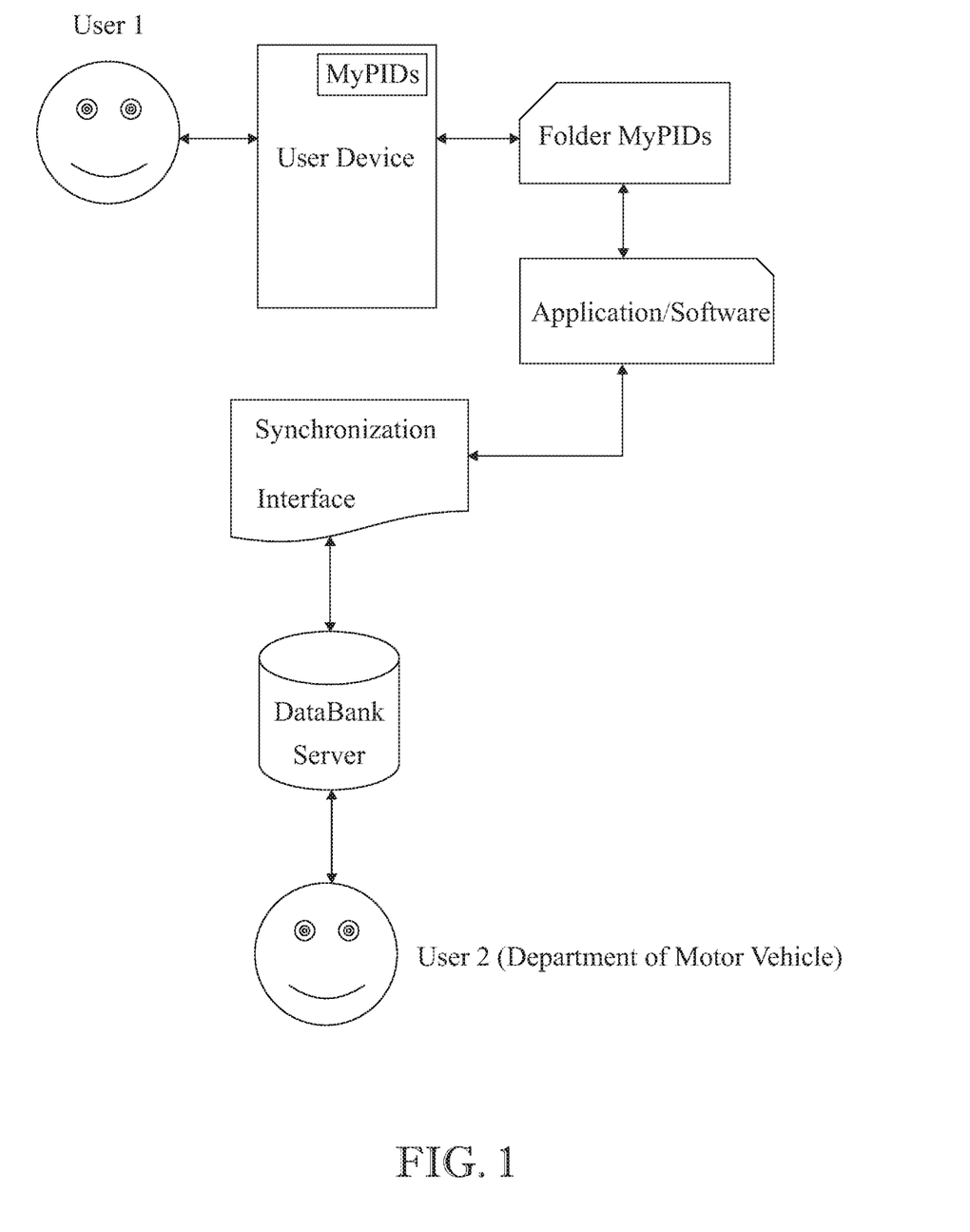
FIG. 1 schematically shows a first example of a disclosed ID system; where a user's ID is synchronized with a department of motor vehicles database, in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Disclosed herein is a unique process, procedure, and system to create a personal secure folder. The system may be named "my personal identifications mobile wallet" (MyPIDs). The system automatically by the configuration of a unique application gives users of computing devices the opportunity to transform plastic ID cards such as driver's licenses and health insurance cards to digital authentic originals. These processes will be available for any appropriate personal computing device (e.g. blackberry, smart phone, personal digital assistant) but also with the capacity for developers to configure the system for use in desktops and other hardware communication products.

The system allows users to create a folder in their device with a digital authentic security certificate that satisfies all identity demands of official governments and private sectors for the verification of an ID. For example, FIGS. 1-4 show various ways that the folder is verified by an authority as being authentic.

Figure 4:
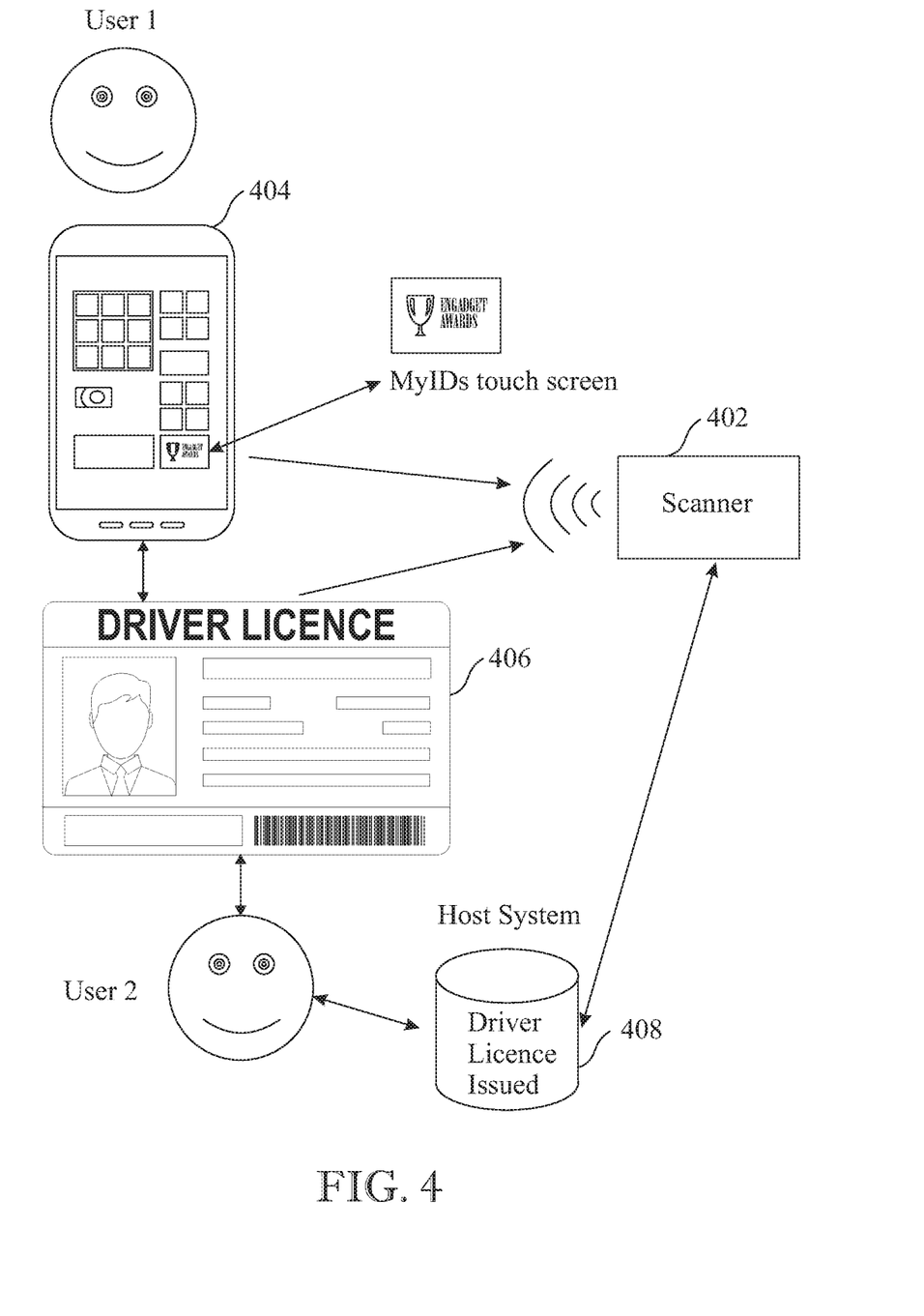
FIG. 4 schematically shows a fourth example thereof, showing a driver's license being stored in the system, in accordance with aspects of the present disclosure.

The herein disclosed virtual electronic IDs may be used to perform and share transactions in government and private contexts. This includes security government institutions and private sectors. In the case of police departments a scanner will be configured to read the user's digital smart phone and have access directly to a server (e.g. including a database) where the user's data is stored. For example, the database shown in FIG. 1 may be the a database configured for voter registration, birth certificates, and passports, as non-limiting examples. As shown throughout the figures, it is to be understood that various transactions may be made between governments and private contexts. For example, a transaction may require a valid ID which is issued by a government, and as shown in FIG. 4 the government issued ID is presented at the user's phone for completing a private context transaction. The above mentioned scanner can be used to scan a document and/or barcode presented on the user's phone. More particularly, the scanner 402 is shown scanning at least one or both of the driver's license 406 and the phone 404. The scanner is shown communicating with host system 408 which may be a database of an authority.

Generally, the system may include a server, and a mobile wireless communications device communicating with the server. The mobile wireless communications device may be configured to store a mobile digital wallet therein, the mobile digital wallet comprising a plurality of digital identification (ID) cards, the mobile digital wallet being stored in a secure folder, and configured to provide a graphical user interface (GUI) for selection of a respective digital ID card.

Figure 2:
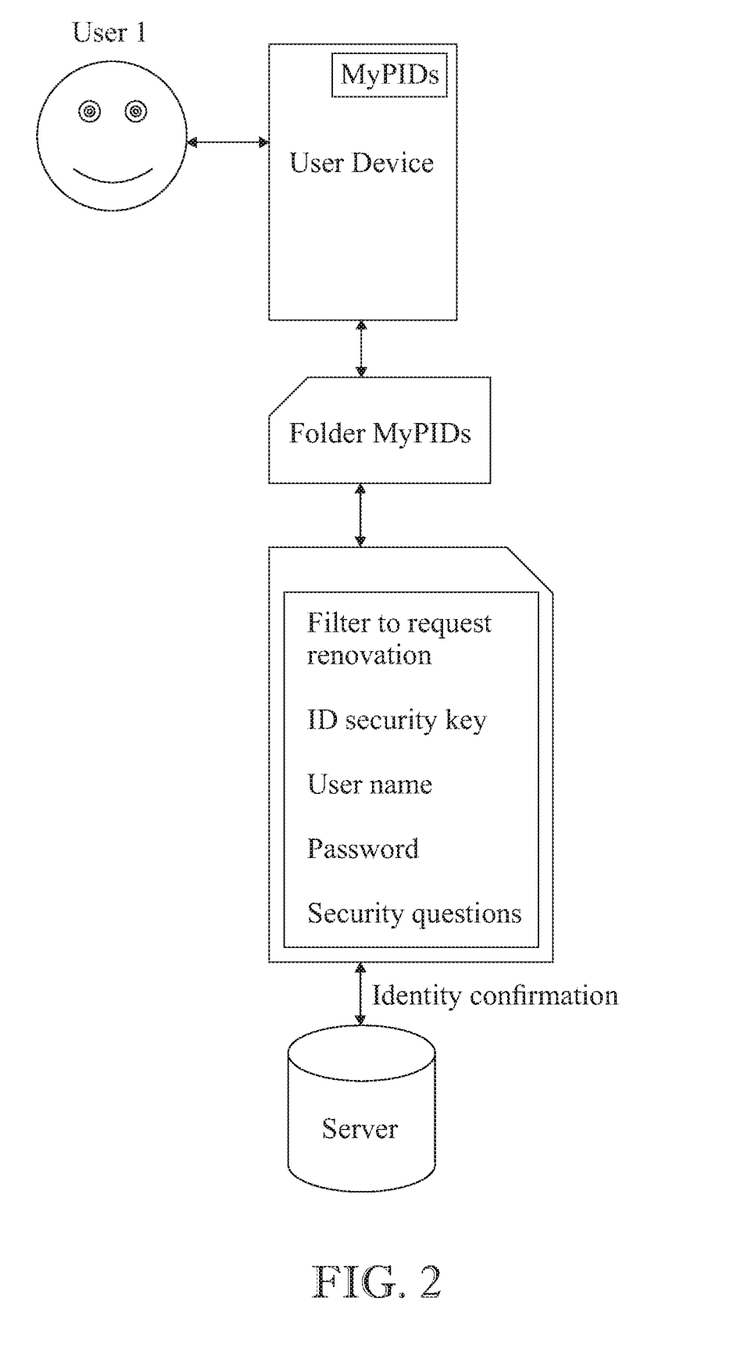
FIG. 2 schematically shows a second example thereof, including a filter, in accordance with aspects of the present disclosure.

The system may include a server that hosts a transaction, a network, a client connected in a communicating relationship with the server over the network, and the client participating in the transaction hosted by the server, and a filter operating between the server and the client to capture data associated with the transaction. For example, such a filter is shown in FIG. 2, and this filter may be a filter for renovation (e.g. first time request).

Figure 3:
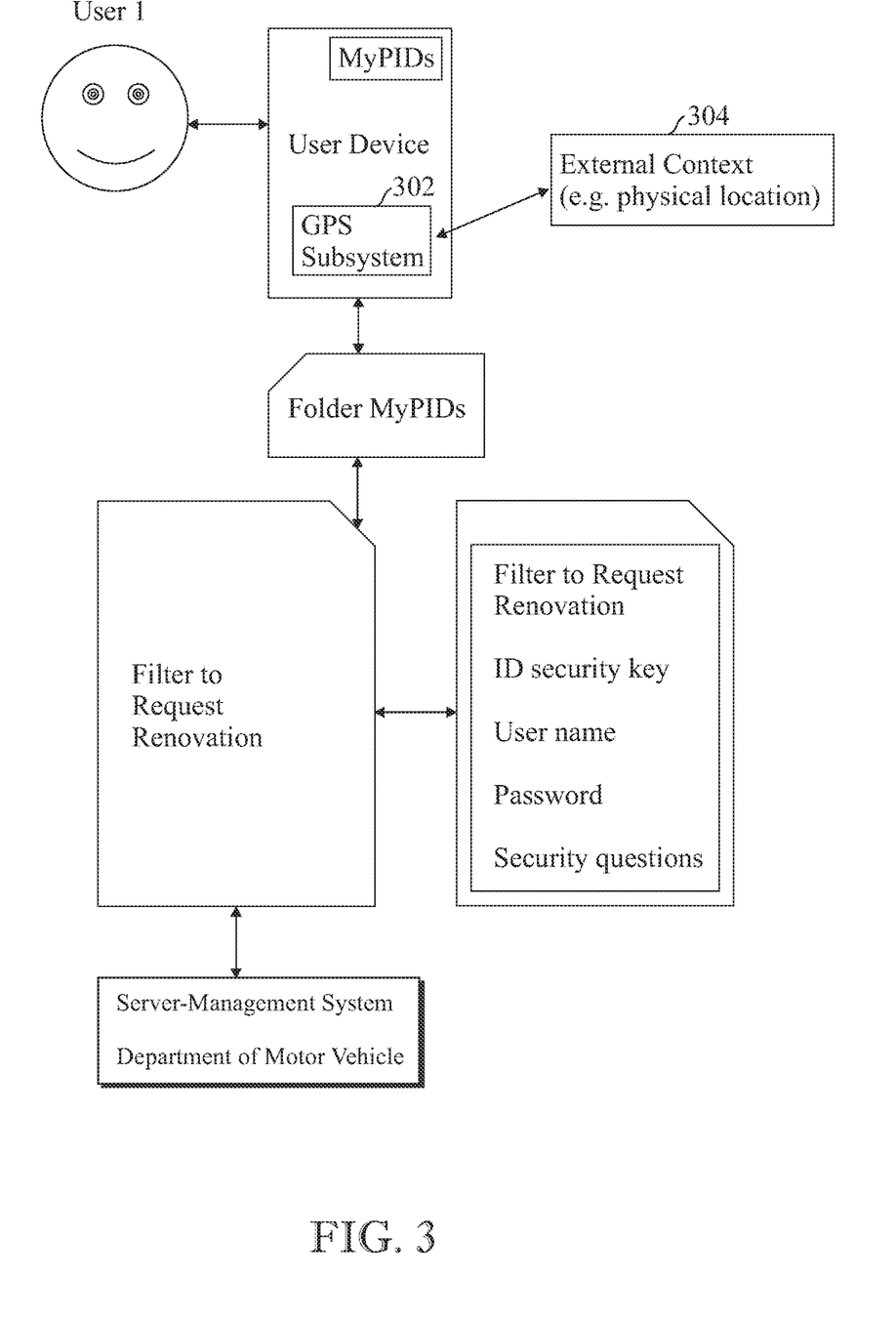
FIG. 3 schematically shows a third example thereof, including a filter to request renovation, in accordance with aspects of the present disclosure.

The system may be configured to provide access to ID profiles on a mobile computing device. The system may include a context determination unit configured to determine contexts associated with user IDs. For example, the context may be external to the mobile computing device. For example, to determine context, a location description unit (i.e. GPS locator) for the mobile computing device may be used to identify a location, and that location may be used to process specific IDs stored in the system. For example, if a user is at a DMV, DMV-related IDs may be automatically prepared and presented for the user. To illustrate this concept of determining context, FIG. 3 shows a GPS subsystem 302 of a mobile device determining a location of an external context 304. The determined location can be used by the system to determine the context (e.g. DMV, or airport). The DMV or other agencies will request that the user provides a location and residential address at the same time to renew and request a new driver's license as a requirement to do a transaction.

A description or presentation of an ID may include a textual description and/or a picture. The system will be configured to give the user the option to select a user name, a password, save personal data, and to update data.

Various advantages can be realized with this invention such as providing users and provider's institutions with greater and rapid convenience when IDs are necessary to be presented, especially since the IDs are stored on the cloud with the option to update data and to replace the requirement of plastic IDs cards.

Further disclosed is a system and method to transform information from a host system to a mobile data communication device. An exemplary system for implementing the invention may include a computing device in the form of a smart phone or blackberry and other devices as mentioned herein.

Components of an external computer may include, but are not limited to, a processing unit, a system memory, and a system bus that couples various system components including the system memory to the processing unit. The device may have the capacity to create a secure separate folder for MyPIDs with executable instructions that, when executed perform a method of separating data stored in a namespace, comprising the functions of: creating a personal user folder configured to store ID profiles, digital data, and security certificates for a plurality of users, and creating a folder with a specially designed user interface for the purpose of storing personal information to be shared with other users. MyPIDs folder may be a subfolder under a category saved and selected by the user.

In a folder-readable storage unit a documents folder may comprise a default storage location for storing IDs in a subfolder for diverse types of documents created by the user. A software application may have the capacity to share MyPIDs with other users. The shared MyPIDs folder may include synchronized copies of data shared with the user by the other users.

Interface synchronization may be implemented by allowing the computer to operate in a networked environment using logical connections to one or more remote computers.

The remote computer may be a personal computer, a server, a router, a network PC, a peer device or other common network node, and typically includes many or all of the elements described above relative to the computer. The logical connections include a local area network (LAN) and a wide area network (WAN), but may also include other networks. For example, such networking environments are commonplace in offices, enterprise-wide computer networks, intranets and the Internet.

Another aspect of the invention may provide a user with the capability of sharing information with other users from within their own MyPIDs virtual folder. Moreover, a user may have the capability to define and individually control other user's rights to data contained to be shared. For example; a user may give permission to one or more other users to access one or more selected folders or IDs. The invention will be provided with read only access to prevent remote users from changing others' files placed in MyPIDs folders.

Each authenticated user of a computing system may have their own user profile on the system in which to store their own data. Each user profile may be identified through use of a combination of alphanumeric characters from a user's first and last name. Those skilled in the art will realize that numerous combinations of characters may be utilized to identify a user's profile. Among the identification method for a user profile, the corresponding authority should use, photo, fingerprints, biometric indicators, and iris identification.

The software application may operate at the mobile device and the host system synchronizes the folder of the mobile device with a folder at the host system and the mobile device then automatically replicates the same data items stored at the host system. A replication of data items can be done for driving licenses with photos, health insurance cards; social security cards, and passport cards, books, and any identification card or data. Replication of the host items results in a virtual ID that is authentically presentable to other parties; and accepted as a verified ID.

The folder structure may include a folder ID, folder type, folder name, and parent folder ID. The folder ID may be a unique tag for each folder. The folder ID may be generated when the mobile device is synchronized to the host system. The type of folder specifies attributes of the folder that differentiates it from other folders. The folder name is the name of the folder that will be displayed on the device or the host system.

An operating system may provide an interface between the mobile computing device's hardware (e.g., the input/output mechanisms and a processor executing instructions retrieved from computer-readable medium) and software.

Example operating systems include the android mobile computing device platform, apple phone/mac operating systems, Microsoft windows or windows mobile operating systems, Symbian operating system; blackberry operating systems, palm web operating systems, a variety of Unix-style operating systems, or a proprietary operating system for computerized devices. The operating system may provide a platform for the execution of application programs that facilitate interaction between the computing device and a user.

The mobile computing device may present a graphical user interface configured for a touch screen. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the device or desktop and the icon's associated text. In some examples, a graphical interface element is selectable with user input.

For example, a user may select a graphical interface element by pressing a region of the touch screen that corresponds to a display of the graphical interface element. In some examples, the user may manipulate a trackball to highlight a single graphical interface element as having focus.

User-selection of a graphical interface element may invoke a pre-defined action by the mobile computing device. In some examples, selectable graphical interface elements further or alternatively correspond to a button on the keyboard.

The goal of the invention is to provide a system having a secure "Unique Folder" for users in the specific system context for storing IDs pre-confirmed and verified by an authority, such that the IDs are validly presentable and accepted by other entities such as police departments or airport security.

In one example, the system includes a mobile computing device, a context determination unit of the mobile computing device that is configured to access determined external contexts associated with the user IDs, the context being external to the mobile computing device (e.g. a driver's license in the context of Department of Motor Vehicles). A request may be sent to an authority, requesting that identity data is verified, and the authority may respond by verifying or denying the identity data.

Demographic, biometric, and health data may be authorized by authorities by matching the data with a prior record on file (e.g. physical documents on file).

The system may be able to provide the ability of renewing driver's licenses. Smart card technology in the mobile device can also be used to protect consumer privacy in a convenient, cost effective, and easy-to-use way. The user may be the only one allowed to change their information using their own sensitive security password and security questions.

A certified authority interacts with the system to give permissions grantable by manual human inspection, and the permissions may be subject to period-of-time constraints. For example, an authority may only authorize permissions to a third party for viewing a user's ID on a certain day or time. The system may use a score based matrix of quality and quantity of validated identification documents.

The system will use score based coefficients such as: Alpha, Pearson, Kendall-Tau-b, and Spearman according to the type of data. These coefficients give score to the quality and quantity to validate identification document content prior to providing the digital ID to the user for authentication.

In another example, the system and method are configured to transform individual identity information from a host system to the user mobile data folder via communication between an authorized certificate agency (e.g. DMV) and the user's mobile device.

The system allows a user to initiate and authorize the privileges associated with his/her credentials in direct communication with a qualified certificate authority such as a government agency or official organization.

The goal of this innovation is to provide a system for people, government, national security and private sectors to accelerate individual identity verification for different transactions when an ID like a driver's license is requested.

The system allows (via a mobile device) the presentation, display, or transfer of an officially authorized ID that has been validated by an official entity, such that the virtual ID is as authentic as a physical plastic ID card, such as a driver's license or health insurance card, as non-limiting examples. These virtual ID cards may be considered virtual authentic originals of identification information stored at a certified authority such as a DMV.

Figure 5:
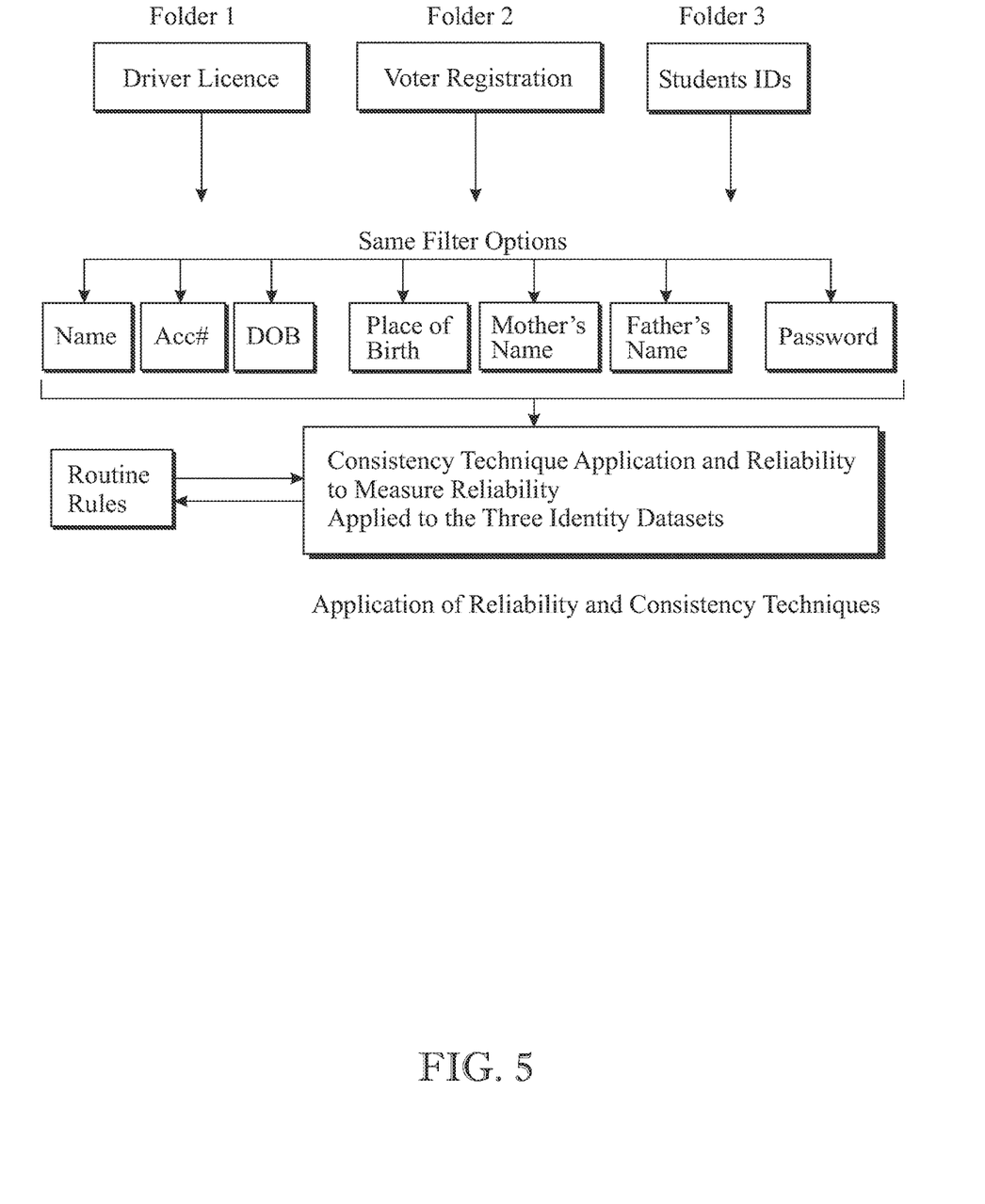
FIG. 5 schematically shows various folders holding various identifications being checked for consistency, and filter options being applied.

The system applies filters and applies reliability and consistency techniques which improve computer-technology, using a consistency and/or reliability statistical functions not previously performable to measure validity of identity data. For example, FIG. 5 shows that various filters such as name, account number, date of birth, place of birth, etc. may be used as parameters or variables to determine if these filters (e.g. categories of data) remain consistent and reliable through time. The consistency/reliability functions may be applied using the Statistical Package of the Social Science program (SPSS). FIG. 5 also shows various different folders, Folder 1, Folder 2, and Folder 3 holding various identifications respectively, Driver's License, Voter Registration, and Student IDs.

The reliability can be assessed by correlating the scores on an established measures score based on such as: Alpha, Pearson. Kentall-Tau-b and Spearman according to the type of data of the different groups of individuals with known quantities of the characteristic being measured, using the Statistical Package for Social Sciences (SPSS) program for Windows.

The Pearson Correlation Coefficient will be used to measure and validate individual identities of those who request an ID prior to validating a digital ID. This coefficient is known as test-retest reliability. The coefficient as well as the others are available in the SPSS statistical program to test the reliability of those individuals asking for an ID.

The Pearson Coefficient specifically provides the opportunity to to apply it to different groups of the population with known quantities of characteristics being measured.

With respect to consistency, the alpha cronbach coefficient will measure the internal consistency of a user requesting an ID with total data characteristics or variables, with a total score. It validates the total identity variables or characteristics of a user requesting an ID.

The reliability may be assessed by correlating the scores on an established measure Pearson Correlation Coefficient to the new (being evaluated) measure, of different groups of individuals with known quantities of the characteristic being measured, using the Statistical Package for Social Sciences (SPSS) program for Windows.

The internal consistency is assessed using (1) the item to total score correlation and (2) Alpha Coefficient (Cronbach's) test using the Statistical Package for Social Sciences (SPSS) program.

It is to be understood that any appropriate security features may be included in the system, such as data encryption, or using security software. If any inconsistency is detected in a user's data, an automatic disconnection will occur. Child subfolders can have different account numbers and/or passwords as compared to parent folders.

A certificate of validation may be checked and provided to a user. For example, a user may select an image for allowing the image to be issued a certificate of validation by an authority. The system may check if a user is not a robot using any appropriate method.

Facial recognition may authenticate a user. A smartphone camera can be used to renew an ID, or for generating an ID for a first time driver, voter, or student who requests an ID, according to prior facial recognition metrics established by authorities. Any appropriate biometric identification system may be included, e.g. detecting eye color, hair, weight, height, finger print, and iris recognition, etc. The system may apply any of the reliability and/or consistency tests described herein to such biometric and physical characteristic identifiers of a user using any appropriate technology developed by academic, public, and/or private organizations to grant a valid virtual identification card.

A reliability test may be applied to data. For example, at two different times (e.g. time 1 vs time 2) a person's age may be verified as being equal at the two different times. Reliability may be presented as a number or fraction, using the Pearson Correlation, significance, and a number of items "N". An example "excellent reliability" value may be 0.949, for example. As a non-limiting example, a Coefficient-Cronbach's-Alpha Model may be implemented to test the consistency of data. For example, a Coefficient Result (Cronbach's Alpha) may be determined using a number of valid and/or excluded cases as variables. This provides consistency data for a whole group with all items, and this method may be done using a set of variables and a set of users.

It is to be understood that any appropriate method may be included from the text of Graziano & Raulin "Research Methods", which is incorporated herein by reference.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A transaction management system comprising:
 a server;
 a mobile wireless communications device communicating with said server;
 said system configured to:
  generate one or a plurality of secure folders for respective users;
  store a given mobile digital wallet therein for a given user, the given mobile digital wallet comprising one or a plurality of digital identification (ID) cards, the given mobile digital wallet being stored in a given secure folder from the plurality thereof,
  provide a graphical user interface (GUI) for selection of a respective digital ID card,
  share at least one digital ID card from the given mobile digital wallet with a different user;
 a synchronization interface in communication with said server and said mobile wireless communications device and configured to synchronize the given mobile digital wallet with said server such that data in the mobile digital wallet is authorized as valid for identification purposes;
 wherein reliability and consistency techniques are statistical functions implemented to measure validity of identity data at two different times; and
 wherein reliability is assessed by correlating multiple identity data variables at certified agencies to measure user population identity data at different times, using test-retest reliability, where a higher correlation means higher reliability of data.

2. The system of claim 1, wherein a folder of the mobile wireless communications device is synchronized with a folder of a qualified certificate authority.

3. The system of claim 2, wherein an ID stored in the folder of the mobile wireless communications device is a valid replica of an issued ID stored in the folder of the qualified certificate authority.

4. The system of claim 3, wherein the ID stored in the mobile wireless communications device is accepted and presentable as a valid virtual ID that is in a protected folder on the mobile wireless communications device.

5. The system of claim 4, wherein the digital ID is issue e qualified certificate authority.

6. The system of claim 4, wherein a verification request is sent to the qualified certificate authority for being verified by the certificate authority, such that upon verification by the certificate authority, the digital ID is as authentic as its respective original physical ID card.

7. The system of claim 1, wherein said mobile wireless communications device is configured to select the respective digital ID card based upon an external context of use.

8. The system of claim 7, wherein the external context of use is determined via a GPS locator.

9. The system of claim 1, wherein the system applies filters to the user's data to evaluate at least one of consistency and reliability of the user's data.

10. The system of claim 1, wherein the consistency and reliability techniques are applied using a Statistical Package of the Social Science program (SPSS).

11. The system of claim 1, wherein internal consistency is part of reliability measurements of data; the internal consistency assessed using a specific total score correlation and an Alpha Coefficient Cronbach's test using a Statistical Package for Social Sciences (SPSS) program.

12. The system of claim 1, wherein a reliability test is applied to data by verifying that part or all of a user's data is equal at the two different times.

13. A transaction management system comprising:
a server;
a mobile wireless communications device communicating with said server;
said system configured to:
generate one or a plurality of secure folders for respective users;
store a given mobile digital wallet therein for a given user, the given mobile digital wallet comprising one or a plurality of digital identification (ID) cards, the given mobile digital wallet being stored in a given secure folder from the plurality thereof,
provide a graphical user interface (GUI) for selection of a respective digital ID card,
share at least one digital ID card from the given mobile digital wallet with a different user;
a synchronization interface in communication with said server and said mobile wireless communications device and configured to synchronize the given mobile digital wallet with said server such that data in the mobile digital wallet is authorized as valid for identification purposes; and
wherein a folder of the mobile wireless communications device is synchronized with a folder of a qualified certificate authority;
wherein an ID stored in the folder of the mobile wireless communications device is a valid replica of an issued ID stored in the folder of the qualified certificate authority;
wherein the ID stored in the mobile wireless communications device is accepted and presentable as a valid virtual ID that is in a protected folder on the mobile wireless communications device;
wherein the digital ID is issued by the qualified certificate authority;
wherein a verification request is sent to the qualified certificate authority for being verified by the certificate authority, such that upon verification by the certificate authority, the digital ID is as authentic as its respective original physical ID card;
wherein said mobile wireless communications device is configured to select the respective digital ID card based upon an external context of use;
wherein the external context of use is determined via a GPS locator;
wherein the system applies filters to the user's data to evaluate at least one of consistency and reliability of the user's data;
wherein reliability and consistency techniques are statistical functions implemented to measure validity of identity data at two different times;
wherein the consistency and reliability techniques are applied using a Statistical Package of the Social Science program (SPSS); and
wherein reliability is assessed by correlating multiple identity data variables at certified agencies to measure user population identity data at different times, using test-retest reliability, where a higher correlation means higher reliability of data.

14. The system of claim 13, wherein the reliability is assessed by correlating scores on at least one of an established measure Pearson Correlation Coefficient, Alpha, Kendall-Tau-b, and Spearman according to a type of data, to a new measure, of different groups of individuals with known quantities of a characteristic being measured, using a Statistical Package for Social Sciences (SPSS) program.

15. The system of claim 13, wherein internal consistency of data is assessed using an item to total score correlation and an Alpha Coefficient Cronbach's test using a Statistical Package for Social Sciences (SPSS) program.

16. The system of claim 13, wherein a reliability test is applied to data by verifying that part or all of a user's data is equal at the two different times.

17. A transaction management system comprising:
a server;
a mobile wireless communications device communicating with said server;
said system configured to:
generate one or a plurality of secure folders for respective users;
store a given mobile digital wallet therein for a given user, the given mobile digital wallet comprising one or a plurality of digital identification (ID) cards, the given mobile digital wallet being stored in a given secure folder from the plurality thereof,
provide a graphical user interface (GUI) for selection of a respective digital ID card,
share at least one digital ID card from the given mobile digital wallet with a different user;
a synchronization interface in communication with said server and said mobile wireless communications device and configured to synchronize the given mobile digital wallet with said server such that data in the mobile digital wallet is authorized as valid for identification purposes; and wherein a folder of the mobile wireless communications device is synchronized with a folder of a qualified certificate authority;

wherein an ID stored in the folder of the mobile wireless communications device is a valid replica of an issued ID stored in the folder of the qualified certificate authority;

wherein the ID stored in the mobile wireless communications device is accepted and presentable as a valid virtual ID that is in a protected folder on the mobile wireless communications device;

wherein the digital ID is issued by the qualified certificate authority;

wherein a verification request is sent to the qualified certificate authority for being verified by the certificate authority, such that upon verification by the certificate authority, the digital ID is as authentic as its respective original physical ID card;

wherein said mobile wireless communications device is configured to select the respective digital ID card based upon an external context of use;

wherein the external context of use is determined via a GPS locator;

wherein the system applies filters to the user's data to evaluate at least one of consistency and reliability of the user's data;

wherein reliability and consistency techniques are statistical functions implemented to measure validity of identity data at two different times;

wherein the consistency and reliability techniques are applied using a Statistical Package of the Social Science program (SPSS);

wherein reliability is assessed by correlating multiple identity data variables at certified agencies to measure user population identity data at different times, using test-retest reliability, where a higher correlation means higher reliability of data;

wherein the reliability is assessed by correlating scores on at least one of an established measure Pearson Correlation Coefficient, Alpha, Kendall-Tau-b, and Spearman according to a type of data; to a new measure; of different groups of individuals with known quantities of a characteristic being measured, using a Statistical Package for Social Sciences (SPSS) program;

wherein internal consistency of data is part of a reliability measurement of data, and is assessed using an item to total score correlation and an Alpha Coefficient Cronbach's test using a Statistical Package for Social Sciences (SPSS) program; and wherein a reliability test is applied to data by verifying that part or all of a user's data is equal at the two different times.

18. A transaction management system comprising:
a server;
a mobile wireless communications device communicating with said server;
said system configured to:
generate one or a plurality of secure folders for respective users;
store a given mobile digital wallet therein for a given user, the given mobile digital wallet comprising one or a plurality of digital identification (ID) cards, the given mobile digital wallet being stored in a given secure folder from the plurality thereof,
provide a graphical user interface (GUI) for selection of a respective digital card,
share at least one digital ID card from the given mobile digital wallet with a different user;
a synchronization interface in communication with said server and said mobile wireless communications device and configured to synchronize the given mobile digital wallet with said server such that data in the mobile digital wallet is authorized as valid for identification purposes;
wherein reliability and consistency techniques are statistical functions implemented to measure validity of identity data at two different times; and
wherein the reliability is assessed by correlating scores on at least one of an established measure Pearson Correlation Coefficient, Alpha, Kendall-Tau-b, and Spearman according to a type of data, to a new measure, of different groups of individuals with known quantities of a characteristic being measured, using a Statistical Package for Social Sciences (SPSS) program.

* * * * *